(No Model.)
R. MARTINEZ.
MAT.
No. 283,501. Patented Aug. 21, 1883.
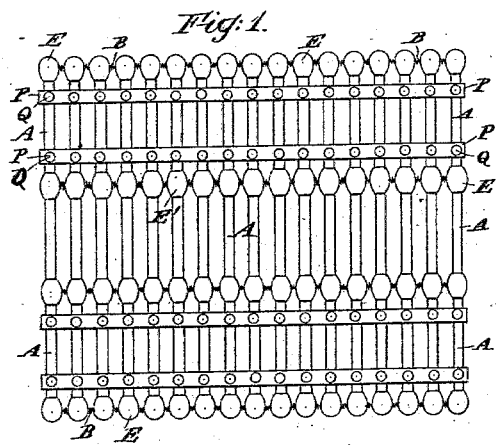
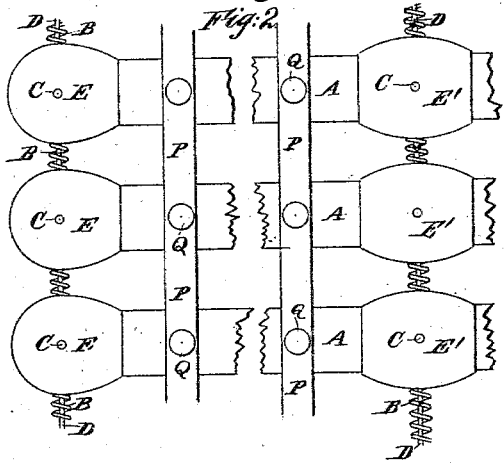
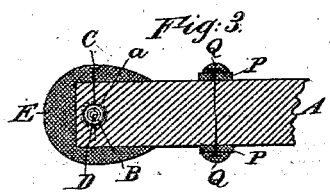
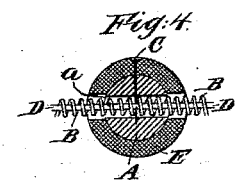
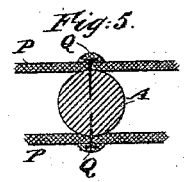
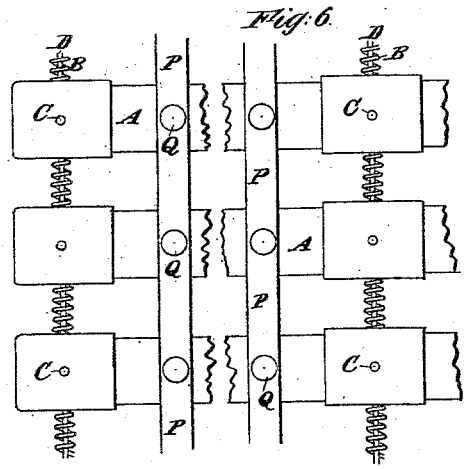
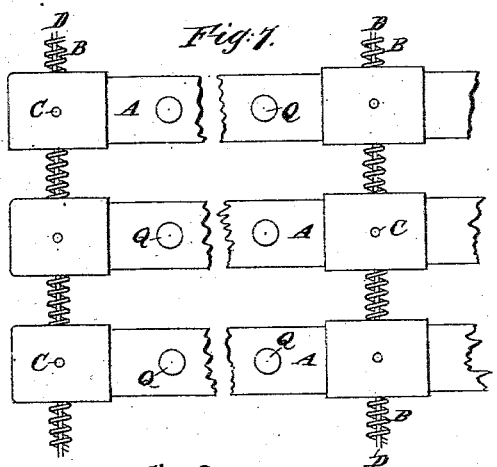
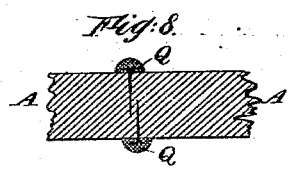
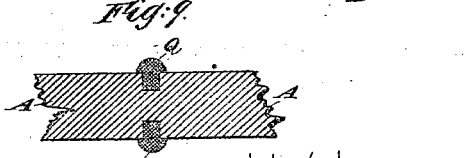
WITNESSES
Charles R. Searle.
M. F. Boyle.
INVENTOR
Rafael Martinez
his attorney
Thomas D. Stetson.

UNITED STATES PATENT OFFICE.

RAFAEL MARTINEZ, OF NEW YORK, N. Y., ASSIGNOR TO EMIL GUTMANN AND HENRY GOODMAN, OF SAME PLACE.

MAT.

SPECIFICATION forming part of Letters Patent No. 283,501, dated August 21, 1883.

Application filed July 17, 1883. (No model.)

*To all whom it may concern:*

Be it known that I, RAFAEL MARTINEZ, a subject of the King of Spain, residing at New York city, in the county and State of New York, have invented certain new and useful Improvements in Mats, of which the following is a specification.

My improved mats are adapted to serve as door-mats on the floors of cars, and on floors generally, wherever it may be desired, to protect the floor or carpet from excessive wear, or to provide cavities for retaining dust, snow, or other waste material.

My improved mat is composed of rods of wood or other suitable rigid material mounted in positions parallel to each other and suitably connected, preferably by hinges or springs, which allow the mats to be rolled up. The mat, so far as yet described, I have set forth in other applications for patent.

The present invention relates to the employment of rubber in connection with such parallel rods. I have discovered that this material—common vulcanized soft rubber—introduced so as to form a bearing or support for the rods where they rest on the floor, softens the concussions due to walking on the mat, and reduces the sound to an almost inappreciable amount. I believe that it will, by preventing the transmission of vibrations, conduce in a marked degree to the durability of the hinges or connections between the slats. In what I esteem the most complete form of the invention, the rubber is employed in the form of rings encircling the rods at the points of junction of each rod with the next, and in the form of caps covering the ends of each rod, and also in the form of strips extending crosswise of the several rods on both faces of the mat. This insures a very elastic support, and allows the mat to be turned over, so as to be used either side up.

The following is a description of what I consider the best means of carrying out the invention.

The accompanying drawings form a part of this specification.

Figure 1 is a plan view of an entire mat. The remaining figures are on a larger scale. Fig. 2 is a plan view of a portion. Fig. 3 is a vertical section in the plane of the axis of one of the rods. Fig. 4 is a section in a plane transverse to the axis. It is a section through one of the ferrules. Fig. 5 is a corresponding section through the transverse strips. The remaining figures show modifications, and will be described further on.

Similar letters of reference indicate corresponding parts in all the figures.

A A, &c., are cylindrical rods of wood, having holes $a$.

E are caps of vulcanized india-rubber.

E' are nearly corresponding rings produced with open ends and fitted at intermediate points on the rods.

B are spiral springs of hard brass wire, extending through the holes $a$ and held in place by cross-nails C, each driven through the rubber E and wood A, and crossing a hole, $a$, preferably a little out of the center.

D are flexible ties, composed of three or other convenient number of small brass wires, formed into a cord and extended each through the spiral spring B from one edge to the other of the mat. The ends of the tie-cords D are secured to the ends of the springs B by soldering or other efficient means.

The caps E and ferrules E' may be produced by vulcanizing in molds of the proper form, in the same manner as has long been practiced in rubber-manufacture. Holes corresponding to $a$ are formed in each ferrule and cap. It is not necessary that the rubber be especially pure; for most uses to which the mats are exposed a larger proportion than usual of adulterating materials may be worked with the gum in preparing the material previous to molding. I use the term "rubber" to indicate the several varieties of elastic compounds analogous to rubber. I give each cap E and each ferrule E' a swelled or spheroidal form, as indicated in Fig. 1.

P P are strips of soft vulcanized rubber extended along on opposite sides of the mat. They are secured by rubber-headed tacks Q, driven through the strip, so as to take a sufficient hold in the wood A.

Any suitable coloring material may be used in the manufacture of the rubber so as to contrast agreeably with the color of the wood A.

A pleasant effect may be produced by employing wood of a uniform oak color, ferrules and caps of black, and the strips P and tacks Q of hues and tones which harmonize with each other and with the pale yellow.

Modifications may be made in the forms and proportions. Other means than the springs B and nails C and wires D may be employed to insure a proper connection between the rods A. The rods A may be of hexagonal or other section, instead of cylindrical, as shown.

Fig. 6 is a plan view of a modification in which the caps E and ferrules E' are not swelled. They may be of metal. In such case the strips P and the rubber-headed tacks Q are alone relied upon to afford the necessary elasticity. Fig. 7 is a plan view, showing a construction in which the elasticity is obtained by the rubber-headed tacks alone. A sufficient number of the tacks are driven into the rods A so as to be presented on each face of the mat. Fig. 8 is a corresponding section. Fig. 9 is a section through still another modification. In this the rubber is applied in the form of knobs, the contracted necks of which, also of rubber, are inserted in corresponding holes in the wood A, and secured by gluing, or in any other efficient manner.

The invention may be used with some success without any fastening of the rubber to the rods. The rubber may be strips laid crosswise under the rods, either loose or fastened to the rods or to the floor by common tacks, or the like.

I claim as my invention—

1. A mat having a body composed of rods of wood flexibly connected together, combined with rubber facing-pieces arranged to elastically support the rods, as herein specified.

2. A mat having rigid rods of wood with rubber on both faces, so as to allow the mat to be reversed and to have an elastic contact with the floor in either position, as herein specified.

3. The rubber caps E and ferrules E', in combination with each other and with the rods A, as herein specified.

4. The mat described, composed of the rubber strip P and fastenings Q, in combination with rigid rods A, as herein specified.

5. The rigid rods A, swelled caps E, swelled ferrules E', rubber strips P, and fastenings Q, combined and arranged to serve as herein specified.

In testimony whereof I have hereunto set my hand at New York city, New York, this 22d day of June, 1883, in the presence of two subscribing witnesses.

RAFAEL MARTINEZ.

Witnesses:
　M. F. BOYLE,
　CHARLES R. SEARLE.